United States Patent

Hanitzsch et al.

[11] Patent Number: 6,094,621
[45] Date of Patent: Jul. 25, 2000

[54] METHOD FOR MIGRATION BEFORE SUMMATION

[75] Inventors: Christian Hanitzsch, London, United Kingdom; Side Jin, Billère, France; Mehmet Ali Can Tura, London, United Kingdom

[73] Assignee: Elf Exploration Production, Courbevoie, France

[21] Appl. No.: 09/091,995

[22] PCT Filed: Oct. 29, 1997

[86] PCT No.: PCT/FR97/01944

§ 371 Date: Jun. 26, 1998

§ 102(e) Date: Jun. 26, 1998

[87] PCT Pub. No.: WO98/19180

PCT Pub. Date: May 7, 1998

[30] Foreign Application Priority Data

Oct. 30, 1996 [FR] France ................................ 96 13253

[51] Int. Cl.[7] .................................................. G01V 1/36
[52] U.S. Cl. ................................. 702/16; 367/53
[58] Field of Search .................... 702/16, 14; 367/53, 367/50

[56] References Cited

U.S. PATENT DOCUMENTS

| | | | |
|---|---|---|---|
| 4,964,103 | 10/1990 | Johnson | 367/53 |
| 4,980,866 | 12/1990 | Wang et al. | 367/52 |
| 4,992,996 | 2/1991 | Wang et al. | 367/53 |
| 5,128,899 | 7/1992 | Boyd et al. | 367/50 |
| 5,285,422 | 2/1994 | Gonzalez et al. | 367/53 |
| 5,530,679 | 6/1996 | Albertin | 367/68 |
| 5,570,321 | 10/1996 | Bernitsas | 367/38 |
| 5,587,942 | 12/1996 | Krebs | 367/50 |
| 5,596,547 | 1/1997 | Bancroft et al. | 367/51 |
| 5,629,904 | 5/1997 | Kosloff et al. | 367/53 |
| 5,764,514 | 6/1998 | Raynaud et al. | 702/14 |

FOREIGN PATENT DOCUMENTS

| | | |
|---|---|---|
| 0430688 | 6/1991 | European Pat. Off. . |
| 2163851 | 3/1986 | United Kingdom . |

OTHER PUBLICATIONS

Geophysics, vol. 60, No. 5, Debski et al, "Information on elastic parameters . . . ", Sep.–Oct. 1995, pp. 1426–1436.

Geophysical Prospecting 41, Landa et al, "Model–Based Stack: A Method for Constructing . . . ", 1993, pp. 661–670.

Geophysics, vol. 59, No. 10, Tygel et al, "Pulse distortion in depth migration", Oct. 1994, pp. 1561–1569.

Primary Examiner—Christine K. Oda
Assistant Examiner—Victor J. Taylor
Attorney, Agent, or Firm—Jacobson, Price, Holman & Stern, PLLC

[57] ABSTRACT

A method for determining migration before summation including recording seismic reflection traces, for constituting a collection of traces to be migrated before summation and without weight correction. The traces being classified according to a given criterion and using a velocity model. The method including determining, for each point of interest M in a domain (X, Z), at least one line of slope determined on the basis of a line of slope map, in determining the specular rays associated with one point M and for the line of slope, and in computing the time and amplitude characteristics of each of the specular rays for deducing therefrom the reflection factor in each point M.

8 Claims, 3 Drawing Sheets

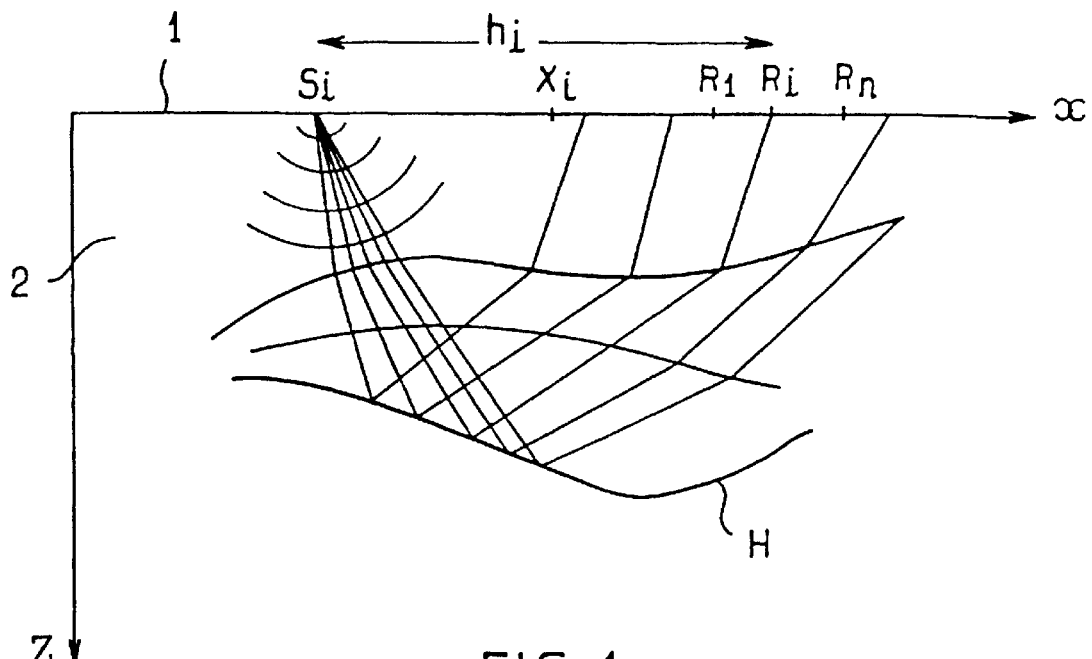
FIG_1
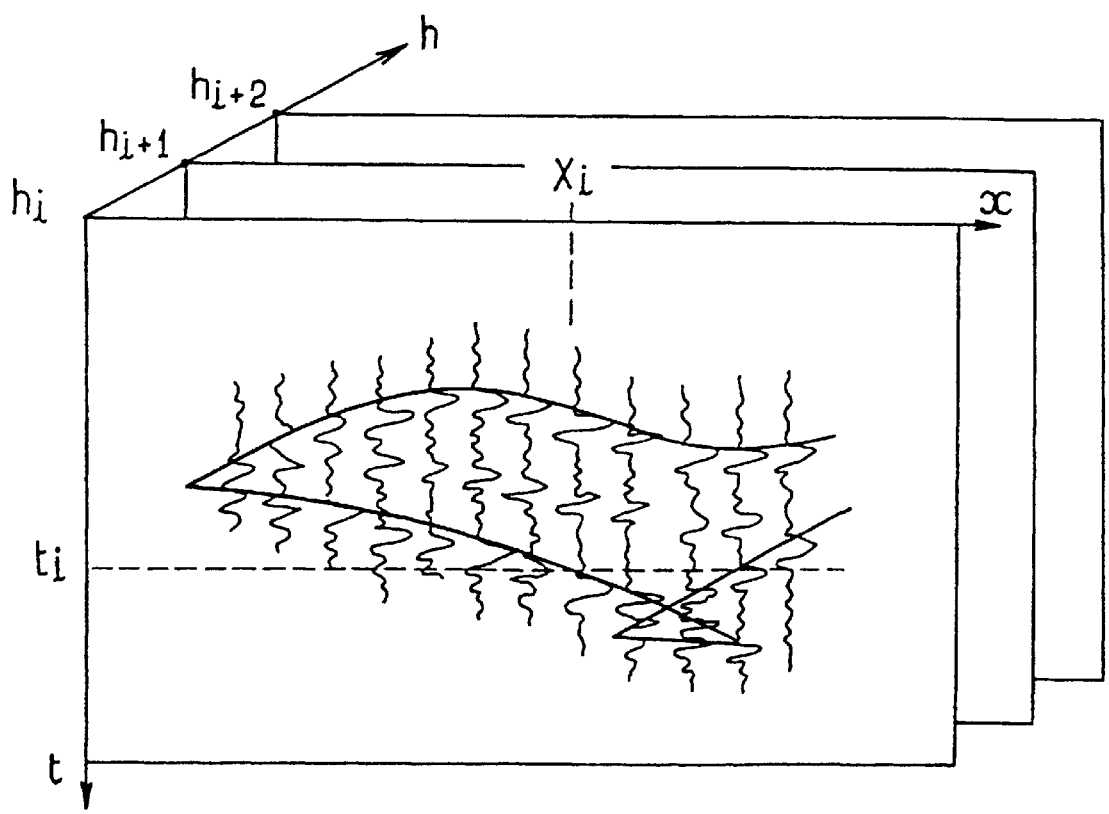
FIG_2

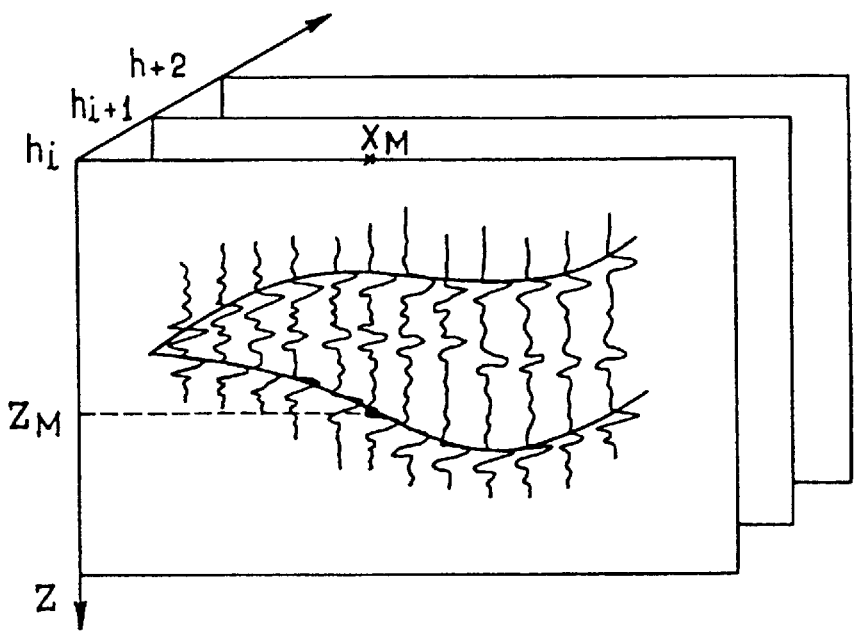
FIG_3
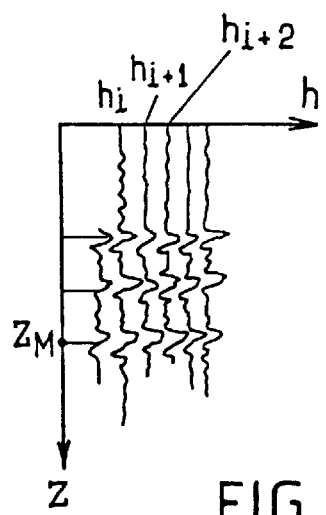
FIG_4
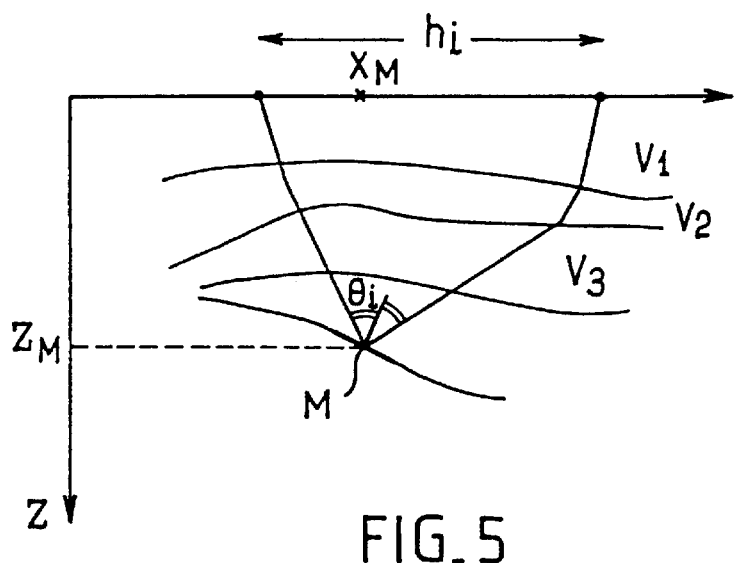
FIG_5

METHOD FOR MIGRATION BEFORE SUMMATION

BACKGROUND OF THE INVENTION

An important object of seismic reflection is to produce a seismic section which corresponds as closely as possible to an image of the elastic reflectivity of the subsurface region which is being explored.

The elastic reflectivity of a subsurface region can be used either to spatially reposition the geometry of the seismic reflectors or horizons, that is to say events which have spatial continuity and which are characteristic of significant geological events, in which case information is then obtained regarding the structure of the subsurface region being explored, or to quantitatively measure the reflectivity or the reflection coefficient, in which case information is then obtained, on the one hand regarding the petroelastic parameter contrasts of a given geological event and, on the other hand regarding the quality of the rocks which caused the reflectivity which is measured.

By applying a variety of theories, for example diffracting point theories, it has become possible to produce seismic images which give a better representation of the reflectivity of the subsurface region being explored.

One of the most widespread methods consists, in particular, in recording seismic traces from the subsurface region. These traces are sorted according to a given criterion, for example common shotpoint, common offset, common midpoint, etc. to obtain one or more trace collections sorted according to the chosen criterion. Then, time or depth-migrating the trace collection or collections previously sorted, using a velocity model which may or may not be defined beforehand but which relates to a zone of the subsurface region, the migration being, for example, of the Kirchhoff type.

All the migration methods are based implicitly or explicitly on stacks (integrals) and are well known to those skilled in the art. The methods based implicitly on stacks are, for example, the methods referred to as wave equation methods, while the methods resorting explicitly to stacks are, for example, the migration methods referred to as Kirchhoff, Born inversion or other migration methods equivalent to these. Each trace of the migrated collection may or may not be weighted, depending on the desired object.

When the object is to obtain, quickly and with low processing costs, an image of the subsurface region which is sufficient for so-called structural interpretation, it is possible either not to use weights (unweighted process) or to use weights which are very rough approximations. However, a technique of this type cannot be used in a much more refined analysis of the amplitude versus offset (AVO) type.

When the desire is, for example, to carry out preserved amplitude migration, it is then essential to weight the traces with suitable weights. Reference may usefully be made to the article by Tygel, published in Geophysics, vol. 59, No. 12 of December 1993, which is a good survey of the techniques employed and which describes the stationary phase theory.

The weighting given to each trace is referred to as the "Green function" and essentially comprises two terms:
 (a) transit times, which are needed irrespective of the migration method used, and
 (b) weights which are calculated accurately and applied to each sample used in Kirchhoff stacking, for example.

This therefore makes it necessary to calculate a very large number of weights, equal to the number of samples involved in the migration, and this is relatively very expensive. Proper processing, that is to say calculating the weights, occupies a computer for several days.

SUMMARY OF THE INVENTION

The object of the present invention is to provide a method of imaging or representing a subsurface region to be explored, which is efficient enough to be used while reducing the processing costs associated with calculating the Green function weights.

One subject of the present invention is a method of the type consisting in recording seismic reflection traces using source/receiver pairs which are arranged on top of a subsurface region to be explored and for each of which the source is separated from the receiver by a distance referred to as the offset.

On the basis of the recorded traces, at least one collection of traces is produced pertaining to a specific zone of the subsurface region. The traces have been sorted according to a given criterion. A propagation velocity model is used pertaining to the zone in an (x,z) domain. In a first phase, only the transit times corresponding to the traces are calculated. Before stacking and without weight correction, the classed traces are migrated by using the velocity model. Using a dip map, established beforehand for the zone and in the same (x,z) domain as the velocity domain, for each point M of interest selected in the (x,z) domain, at least one dip is determined. The specular rays associated with the point M for the dip and for a range of offsets defined beforehand are determined. The time and amplitude characteristics of each of the specular rays are calculated. The reflectivity at each point M of interest on the basis of the characteristics is determined.

An advantage of the present invention is that it limits the calculation of the weights to a small number of traces, or more exactly specular rays, compared with the number of traces which is needed in all the prior processes.

Another advantage of the present invention resides in the fact that it can be applied to highly refined analyses of the AVO type.

Another advantage of the present invention is that it makes it possible to split the various steps and to perform them separately in different units.

BRIEF DESCRIPTION OF THE DRAWINGS

Other advantages and characteristics will emerge more clearly on reading the description of the process according to the invention, as well as the appended drawings, in which:

FIG. 1 is a schematic representation of a device used in exploration of the seismic reflection type;

FIG. 2 is a schematic representation of a collection of traces sorted with constant offset;

FIG. 3 is a schematic representation of a depth-migration of the traces of the collection represented in FIG. 2;

FIG. 4 is a schematic representation of a group of traces constituting an iso-$X_M$ collection;

FIG. 5 is a schematic representation of a plot of specular rays in the propagation velocity model.

DETAILED DESCRIPTION OF THE PREFERRED EMBODIMENTS

Figure 6:
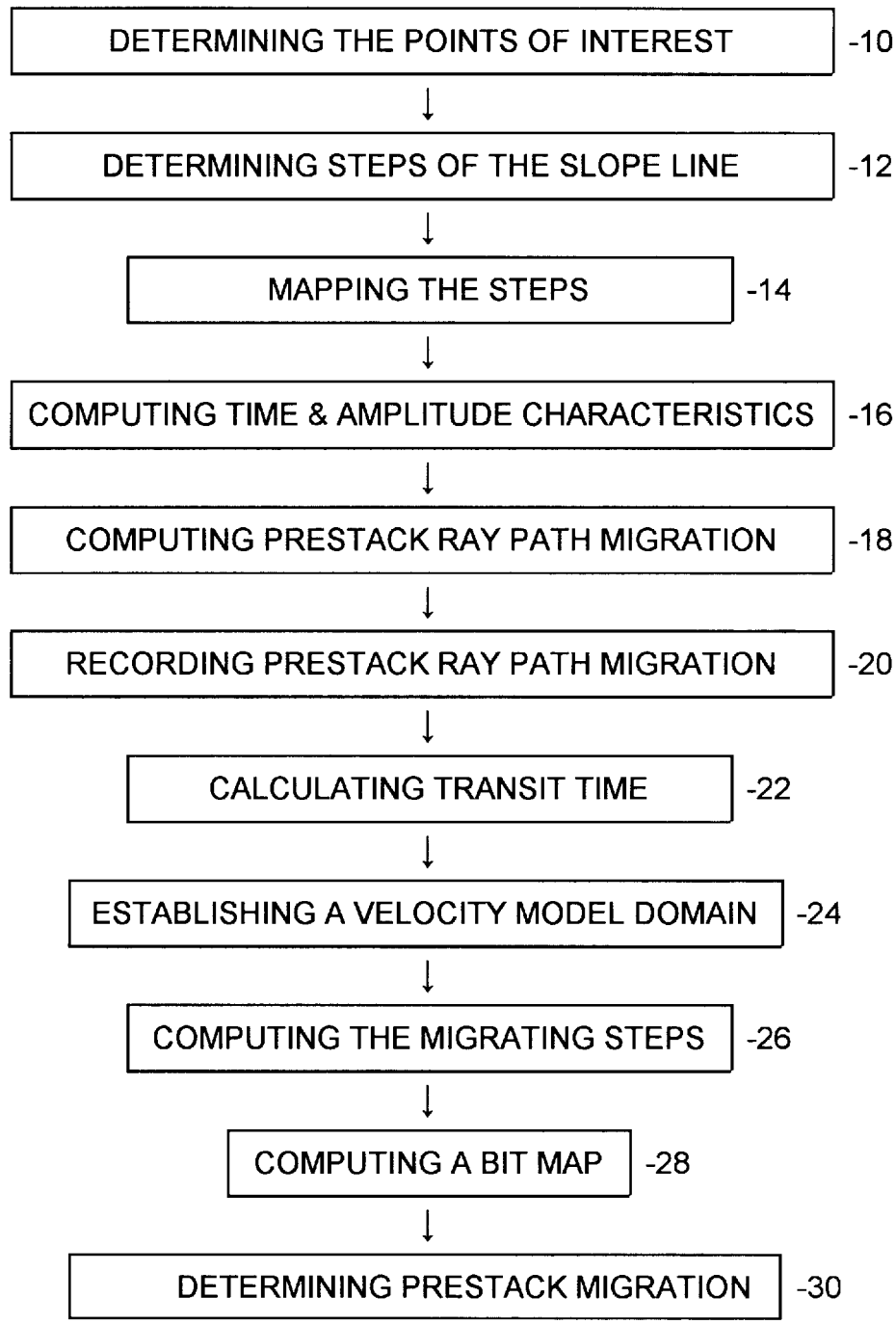
FIG. 6 is a block diagram showing the steps of calculating a velocity model.

One or more sources S and receivers $R_1$ to $R_n$ are arranged on the surface 1 of a subsurface region 2 for which it is desired to produce an image of the reflectivity, the distance $h_i$ separating the source $S_i$ from a receiver $R_i$ being referred to as the offset. From the source $S_i$, waves are emitted which propagate in the subsurface region 2 and which, after reflection from horizontal or parallel reflectors or horizons H, reach the receivers $R_1$ to $R_n$ where they are recorded in the form of traces. In a first step, the traces are sorted according to a specific criterion, for example by common shotpoint, by common midpoint, by common receiver, with common offset, etc. An example of a collection of traces is represented very schematically in FIG. 2, and relates to a specific zone of the subsurface region 2, the sorting having been carried out with constant offset $h_i$. For another constant offset $h_{i+1}$, there would be another trace collection similar to the one in FIG. 2; likewise for another offset $h_{i+2}$ etc.

In a second step, a time- or depth-migration of each collection of traces such as the one in FIG. 2 is carried out, for example a depth-migration using, in particular, the Kirchhoff prestack migration, but in a simplified and quick version, in order to obtain a series of intermediate migrated images, which corresponds to one image per offset or per shotpoint or per any other common parameter X. To do this, use is made in the conventional way of an x, z propagation velocity model which is established or, preferably, has already been established for the said zone in question. The migrated images may be produced in 2-D (two dimensions) or in 3-D (three dimensions) in the time or depth domain, like the image represented very schematically in 2-D in FIG. 3.

A group of the traces of each of the intermediate migrations corresponding to the same surface position X of a point M is referred to as an iso-value (iso-$X_M$) collection or "image gather".

After migration of the collections of traces corresponding to each constant offset, such as the ones represented in FIG. 3, an image gather as represented in FIG. 4 is obtained for the various offsets in question $h_i$, $h_{i+1}$, $h_{i+2}$, . . .

On the basis of any one of the intermediate migrated images obtained beforehand, their stack, or alternatively on the basis of any other preexisting image such as the post-stack depth migration image, known means, for example the ones developed by Elf Exploration Production and known by the name SISMAGE, are used to define a map of the dips in the (x, z) domain of the zone in question.

In the velocity model, represented very schematically in FIG. 5, an arbitrary point M with coordinates $x_M$, $z_M$ is chosen. With the aid of the aforementioned dip map, the value and the direction of the dip at the point M are determined. In FIG. 5, the dip at M is represented symbolically by a line 4.

In another step, a first specular ray at the point M is calculated, for example by fixing a source point $S_i$, a transit time $t_i$ along the ray $S_iMR_i$, $R_i$ being the measurement point on the surface, as well as the parameters relating to the change in the amplitudes of the waves along the path (dynamic ray-tracing). This step is repeated for various pairs $S_iR_i$, which makes it possible to obtain a set of specular rays at the point M for a given range of offsets.

There are other methods for finding the pair $S_iR_i$ which carries the specular reflection corresponding to the point M; for example if one "shots" from $S_i$ to M, then from M to the surface while respecting the law of reflection at M, the ray from M has no reason to reach the surface at a measurement point $R_i$. One must therefore carry out interpolations until finding the pair $S_iR_i$ which, associated with the point M, is specular.

Each specular ray at the point M gives a relationship between the offset $h_i=S_iR_i$ and the angle of reflection $\theta_i$ which are associated with the specular ray.

For each specular ray, the Green function associated with it is calculated, which makes it possible to determine the weight which must be applied to the sample of each intermediate migration specific to the constant parameter, for example $h_i$, in order to obtain a good representation of the reflectivity at the point M for this parameter $h_i$.

Thus, for a given offset $h_i$, there is a single specular ray and a single correction weight corresponding to this specular ray.

In each intermediate migration image, for a same point M with coordinates $X_M$, $Z_M$, there is a set of samples of the iso-X collection or "image gather", each sample corresponding to a given offset or a given shotpoint in the range chosen for calculating the specular rays. Since each sample of each trace in the iso-X collection has a corresponding specular ray of the velocity model, it therefore becomes possible for the Green function weight associated with the specular ray to be applied to the sample.

The result of this operation is that the sample at depth $Z_m$ is proportional to the reflectivity of the point M for the corresponding angle $\theta_i$.

It is thus possible to produce a series of final migrated images of the same kind as those which would have been obtained with a complete migration of the Kirchhoff type, and which, with the information relating to the reflection angles $\theta$, will be able to be used in the well-known AVO analysis process since it is possible to establish maps $R=f(\theta)$.

Of course, the various steps and operations described above are carried out again for all the points M in the zone of interest of the (x, y, z) domain in question.

As can be seen from the above description, the present invention constitutes a significant improvement to the conventionally used techniques since, on the one hand, the calculation of an angle of reflection by a Kirchhoff triple stack is avoided by substituting for it direct measurement on a pre-established image and ray tracing, which are easier to carry out and much less expensive, and, on the other hand, the corrective weights to be applied for measuring the reflectivity are calculated only for the specular rays specific to the angle of reflection, and not for all angles of reflection corresponding to all the collections of original traces consisting of all the recordings of the receivers.

Another advantage, which is not insignificant, is that it is possible, if desired, to split the various steps of the process according to the invention into several parts, it being possible for each of the parts to be carried out in a separate unit. For example, the calculation of the simplified intermediate images without calculating the Green function weights may be entrusted to a specialist unit, such as a contractor.

The above description and the appended figures correspond to an embodiment for iso-offset collections. However, it is perfectly possible according to the invention to select other common parameters, such as the shotpoint, the method according to the invention then being applied to iso-shotpoint collections.

An important advantage of the present invention, as is apparent in the light of the description, resides in the fact that, instead of calculating and applying all the weights corresponding to all the possible dips at M, which is expensive, only the weight associated with the dip measured at M is calculated. It is also possible, in order to refine the results, to apply the method according to the invention to a small range of values of dip at the point M. Furthermore, the Green function weight associated with the specular ray may be a scalar or a complex number.

It is also possible to vary the dip at the point M around the nominal value as calculated or determined, for example by the SISMAGE process. In this case, a plurality of values of the dip are determined, the specular rays associated with the point M are determined for each of the values of the dip, and a selection, an average or any other statistical method is used to determine the Green function weight and the dip assigned to the point M. This is done in order to minimize the inaccuracy of the nominal value.

Similarly, it is possible to vary very slightly the position of the point M, of the source $S_i$ and/or of the receiver $R_i$ which are associated with the point M, within the limit imposed by Fresnel's theory. A variation of this type is said to be carried out in the Fresnel zone and is well-known to those skilled in the art. Depending on whether the first or second Fresnel zone is chosen, the variation of one or more positions should be such that the $S_iM$ transit time is less than one quarter or one half of a wavelength.

In FIG. 6, a flow chart is shown for the steps of calculating a velocity model. Initially, the points of interest are determined at step 10. The slope line is then determined at 12 and the steps mapped at 14. The time and amplitude characteristics are computed at 16. The prestacked ray path migration is computed at 18. The prestacked ray path migration is recorded at 20 and the transit time calculated at 22. A velocity domain model is established at 24 and the migrating steps are computed at 26 with a dip map computed at 28 to determine the prestack migration at 30.

What is claimed is:

1. A method of determining prestack migration comprising the steps of:

recording seismic reflection traces using source/receiver pairs which are arranged on top of a subsurface region to be explored and for each of which the source is separated from the receiver by a distance referred to as an offset, producing on a basis of the recorded traces, at least one collection of traces pertaining to a specific zone of the subsurface region, the traces having been sorted according to a given criterion, using a propagation velocity model pertaining to the specific zone in an (x,z) domain, calculating, in a first phase, only the transit times corresponding to the traces, migrating, before stacking and without weight correction, the sorted traces by using the propagation velocity model, using a dip map, established beforehand for the specific zone and in a same (x,z) domain as a velocity domain, determining, for each point M of interest selected in the (x,z) domain, at least one dip taken from the dip map, determining specular rays associated with the point M for the at least one dip and for a range of offsets defined beforehand, calculating a time characteristic and an amplitude characteristic of each of the specular rays, and determining a reflectivity at each point M of interest on a basis of the time and amplitude characteristics.

2. Method according to claim 1, wherein the traces migrated without weight correction which correspond to a same surface position of the point M are grouped together in an iso-value collection.

3. Method according to claim 2, wherein the weight of the Green function of the specular ray associated with the sample is applied to each of the samples of the iso-value collection of traces which corresponds to the point M.

4. Method according to claim 1, wherein the prestack migration is a depth migration.

5. Method according to claim 1, wherein the prestack migration is a time migration.

6. Method according to claim 1, wherein, for each specular ray, a relationship between offset and angle of reflection is determined, and then a relationship between reflectivity and angle of reflection is determined, and said relationships are used in an amplitude versus offset technique.

7. Method according to claim 1, wherein a plurality of values of the dip are determined for each point M of interest, and the specular rays associated with the point M are determined for each of the values of the dip, and then the specular rays are averaged.

8. Method according to claim 1, wherein at least one of the positions of the point M of interest is varied, of at least one of the source $S_i$ and of the receiver $R_i$ which are associated with the point M, in determining the specular rays corresponding to the variations, and then in averaging the specular rays.

* * * * *